United States Patent Office
3,719,564
Patented Mar. 6, 1973

3,719,564
METHOD OF DETERMINING A REDUCIBLE GAS CONCENTRATION AND SENSOR THEREFOR
Arnys C. Lilly, Jr., and Calvin O. Tiller, Richmond, Va., assignors to Philip Morris Incorporated, New York, N.Y.
Continuation-in-part of applications Ser. No. 878,287, Nov. 20, 1969, and Ser. No. 45,713, June 12, 1970, both now abandoned, Ser. No. 45,804, June 12, 1970, now Patent No. 3,657,016, and Ser. No. 46,158, June 15, 1970. This application May 10, 1971, Ser. No. 141,779
The portion of the term of the patent subsequent to Oct. 17, 1989, has been disclaimed
Int. Cl. G01n 27/00, 27/46
U.S. Cl. 204—1 T                                29 Claims

ABSTRACT OF THE DISCLOSURE

A reducible gas sensor comprising an electrochemical cell including a cathode, an anode and an electrolyte of a rare earth fluoride. The cell provides ambient reducible gas with ingress to the electrolyte and the conductivity of the electrolyte is accordingly modified, thus providing the cell with a measurable characteristic indicative of ambient concentration of the gas. A rugged miniature sensor, adapted for use in physically disturbed environments and preferably self-powered, is formed by thin film deposition of the cell elements.

---

This application is a continuation-in-part of copending applications Ser. No. 878,287, filed on Nov. 20, 1969, now abandoned; Ser. No. 45,713, filed on June 12, 1970, now abandoned; Ser. No. 45,804, filed on June 12, 1970, now U.S. Pat. No. 3,657,016 and Ser. No. 46,158, filed on June 15, 1970.

FIELD OF THE INVENTION

This invention relates to apparatus for quantitative analysis and more particularly to small-sized rugged sensor apparatus adapted for environmental use to measure reducible gas concentration.

BACKGROUND OF THE INVENTION

Presently known sensors for indicating reducible gas concentration comprise an electrochemical cell typically including a pair of electrodes and a liquid electrolyte disposed in contact therewith. The cell may be encased within a membrane which functions, when required, to prevent ingress into the sensor cell of contaminants which may adversely affect the electrodes or electrolyte. In ambient environments containing plural reducible gases, the membrane may have characteristics providing exclusive ingress of a selected reducible gas into the electrolyte. The electrodes are connected through a current-indicating meter to an external power supply. Typically in these sensors the current therein provided by electrolytic conduction in the highly dissociative liquid electrolyte is substantially increased upon introduction of the selected reducible gas, e.g., oxygen, into the electrolyte and the meter indicates same to provide a direct indication of oxygen concentration in the tested sample.

Known oxygen sensors of this type have evident shortcomings for applications requiring a small-sized and/or rugged sensor. The reliance of known sensors on liquid electrolytes and the inclusion therein of structure for maintaining particular relation between the electrolyte and the electrodes severely limits size reduction of the sensor and directs further that the sensor be isolated from mechanical shock, vibration or abrasion which might disturb the relation between electrolyte and electrodes, or develop pin-hole ruptures of the membrane resulting in electrolyte leakage. Clearly such known electrochemical cell sensors are incapable of direct environmental use in such applications and it is customary to extract samples from the operative environment and apply same to the sensor in a protective environment. A further disadvantage is the requirement of an external power supply.

Typical structure employed in these known sensors is set forth in U.S. Pat. No. 2,913,386 issued to L. C. Clark, Jr. on Nov. 17, 1959. Therein a sensitive electrode (cathode) and a reference electrode (anode) are precisely spaced from the inner surface of an oxygen-permeable membrane exposed to the sample. Such spacing maintains both electrodes in contact with a thin liquid film of electrolyte interposed between the electrode and the membrane. The electrolyte is provided and constantly replenished by an extensive electrolyte reservoir contained in the tubular housing of the sensor assembly, said liquid electrolyte film providing a short diffusion path between the membrane and the electrodes. The electrodes are connected to a power supply through leads extending externally of the sensor assembly. Protection against contaminate ingress is provided by membrane selection, the membrane being comprised of polyethylene or like material. Alternatively, known oxygen sensors may incorporate such materials as charcoal filters or metallic barriers, such as silver, for controlling cell permeability to a desired gas as disclosed respectively in U.S. Pat. No. 2,278,248 issued to W. A. Darrah on Mar. 31, 1942, and U.S. Pat. No. 2,787,903 issued to R. B. Beard on Apr. 9, 1957. As to relative size, the aforementioned Clark patent is illustrative of the capabilities of the prior art, providing for a "minimum" size device comprising a cylinder one-half inch in diameter and four to five inches in length.

In addition to the size and ruggedness limitations, known electrochemical cell sensors are further inappropriate in various industrial applications requiring a low cost sensor. By virtue of the above-discussed electrode spacing parameters, liquid electrolyte containment, membrane arrangement, associated power supply and the like, the manufacture of known sensors is relatively costly.

SUMMARY OF THE INVENTION

It is an object of the present invention to provide improved electrochemical cell sensor apparatus for measurement of reducible gas concentration.

It is a further object of the invention to provide a ruggedized reducible gas sensor particularly adapted for use in applications involving mechanical disturbances such as shock, vibration, and tilting.

It is an additional object of the present invention to provide a reducible gas sensor of minute physical dimension adapted for use in space limited applications.

It is a further object of the invention to provide a self-powered reducible gas sensor.

It is an additional object of the present invention to provide a reducible gas sensor particularly adapted for economical mass production.

In the efficient attainment of these and other objects, there is provided in the present invention reducible gas sensor apparatus including an electrochemical cell having a noble metal cathode, an anode and a rare earth fluoride electrolyte, the cell providing ambient reducible gas with ingress to the cell electrolyte. In direct contrast to the liquid electrolyte prior sensors, in the solid electrolyte apparatus of the invention the prior adverse effects of environmental shock and vibration are rendered inconsequential in the accurate determination of reducible gas concentration as indicated by change in the conductivity of the cell electrolyte. Such totally immobile electrolyte further eliminates the possibility of electrolyte loss accompanying environmental abrasion such as pin-hole puncturing or the like. Moreover, the application of solid state technology to the present field, enabled by the determination of suitable sensor structure for providing reliable, sensitive and accurate response, enables extensive reduction in space requirements and manufacturing costs. By appropriate selection of anode and cathode materials, the sensor itself may be fabricated to provide the interelectrode potential difference required for electron capture by the reducible gas with the result that miniaturized self-powered sensors are provided.

In accordance with the invention sensors are preferably constructed by depositing, upon a base plate, intervening anodic, electrolytic, and cathodic films. In ambient environments containing plural reducible gases, the sensor may include a film selectively permeable to a reducible gas of interest, such film cooperating with said base plate to define a sensor casing. Preferably, the sensor is employed without such gas-selective film and a gas of interest is examined by comparison of sensor output currents for different applied voltages, as discussed in detail below. In ambient environments containing plural nonreducible gases and a reducible gas of interest, such output current comparison or selective film may be dispensed with. The sensor cell may provide a reducible gas with ingress to its electrolyte by exposing the electrolyte to the gas either directly or through porous electrode structure. As will be discussed hereinafter, various structural arrangements of said intervening films may be provided through the use of insulative films.

The above objects and other features of the invention will be evident from the following detailed description of the invention and the several illustrative embodiments shown in the drawings.

DESCRIPTION OF THE PREFERRED EMBODIMENTS

Figure 1:
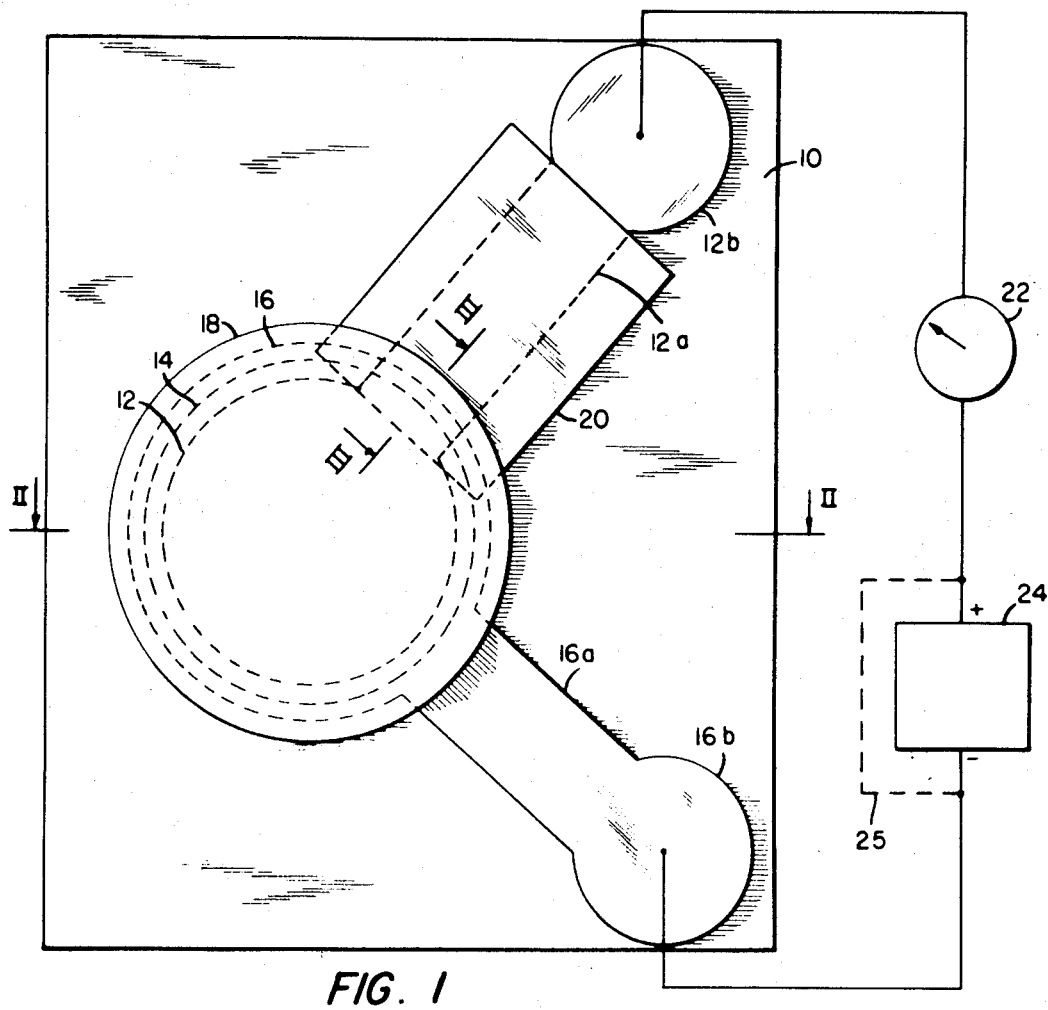
FIG. 1 is a plan view of a preferred embodiment of the sensor of the invention illustrated in association with a power supply and current indicator.

In order to enable a clear understanding of the present invention, it will be helpful initially to discuss the character of the electrochemical cell thereof prior to detailed discussion of the sensor and the illustrated preferred structural embodiments thereof.

A basic characteristic of the electrochemical cell, alluded to briefly by way of summary above, is that it exhibits varying electrical conductivity in accordance with the concentration of reducible gas in the cell electrolyte. While such variation is preferably linear, it need not be precisely proportional to reducible gas concentration, but should be repeatable, i.e., conductivity changes from a datum concentration level to given concentration levels should always be of the same magnitude for like concentration changes. Where conductivity change is nonlinear but repeatably so, suitable compensating nonlinearity may be incorporated in the associated cell current reporting circuitry, e.g., logarithmic or like meters may be employed.

Sensitivity, of linear or nonlinear nature, to reducible gas concentration requires that the cell be operative upon ingress therein of the reducible gas to electrolytically conduct the various resulting anions of the gas, e.g., $O_2^-$, $SO_2^-$, and the like. In a liquid electrolyte system, there is of course no inhibition to conduction of these anions. In the aforementioned Clark system and the like, electrolytes constituted by potassium hydroxide in aqueous solution exhibit substantially total dissociation into alkali metal cations and halide anions and ion mobility for essentially all ionic species is provided. In contrast, solid electrolytes exhibit relatively minute dissociation, and numeous solid electrolytes exist which have lattice structure characteristics providing substantially no mobility to the reducible gas anions.

Apart from this electrolyte lattice structure characteristic on which electrolytic conductivity is dependent, there remains the chemical compatibility characteristic, i.e., the conversion of mobile reducible gas anions, particularly desired where long sensor life is required. In the Clark-type systems, the abundance of water or, as is also proposed therein, the maintenance of a buffer supplying hydrogen ions to the electrolyte, readily enables chemical reactions embracing mobile oxygen anions forming the hydroxyl anion and ultimately water. In the case of non-aqueous electrolytes, such oxygen reactivity or reactivity to other reducible gases is not inherent.

By initial determination of these inherent distinctions in electrical and chemical characteristics existing between prior sensors and sensors capable of similar detection with solid state constituents, applicants have further determined certain fundamental relations requisite for high performance solid state sensors. The electrolyte thereof is a solid in which, relative to other solids, selective anions have a high mobility at room temperature. Further, such anionic conductivity must accommodate anions of size comparable to that of the anions of oxygen and other reducible gases. A relatively high dielectric constant is also desired to accommodate electron capture by reducible gas molecules. Such electron capture is readily supported in aqueous electrolytes in view of the dielectric constant of water (78.5). However, numerous solid electrolytes fall far short of this figure.

Applicants have found that the rare earth fluorides exhibit to a uniquely high degree such characteristics determined necessary for a solid state reducible gas sensor electrolyte, i.e., the fluorides of scandium, yttrium, lanthanum and of the metals of the lanthanide series (atomic numbers 58 through 71), e.g., cerium, praseodymium, neodymium and erbium.

In anionic conductivity, these compounds exhibit a conductivity of $10^{-7}$ mho/cm. to $10^{-6}$ mho/cm. Further, the rare earth fluorides exhibit a large density of Schottky defects, i.e., crystalline lattice vacancies created by the removal of an ion from its normal site and placing same on or near the crystal surface. At room temperature, in excess of $10^{19}$ fluorine vacancies per $cm.^3$ are provided, the vacancies being sufficient in size to provide mobility for the relatively large anions of reducible gases. Finally, the dielectric constants thereof have been found to accommodate electron capture by such gases.

The requirements for the electrodes of sensors constructed in accordance with the invention will be evident from a consideration of the presumed electrochemical reactions therein. In one electrochemical cell of the sensor of the invention, a lanthanum fluoride electolytic film is employed in conjunction with a silver anode and a gold cathode. With a potential difference applied to these electrodes and in the absence of a reducible gas, these cell reactions are presumed:

In the electrolyte:

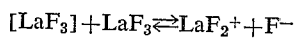
$$[LaF_3] + LaF_3 \rightleftharpoons LaF_2^+ + F^-$$

At the anode:

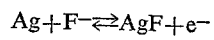
$$Ag + F^- \rightleftharpoons AgF + e^-$$

$$Ag \rightleftharpoons Ag^+ + e^-$$

The lanthanum difluoride cation is substantially immobile, and the gold cathode merely provides electrons, Upon the ingress of a reducible gas, e.g., oxygen, into the cell electrolyte, electron capture occurs under the influence of the applied potential difference and the cell reactions are presumed to be, in addition to the above:

At the cathode:

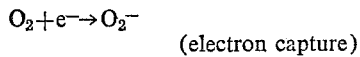

(electron capture)

At the anode:

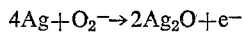

The electrode requirements for a long life sensor are evidently that the cell anode form stable fluorides and compounds of the reducible gas, e.g., oxides, and that the cell cathode be an inert conductor. Thus, examples of various metals which are usable as cell electrodes, include for the cathode—gold, platinum, rhodium, and palladium, and for the anode—silver, zinc, bismuth, beryllium, cadmium, rubidium, lanthanum, iron, nickel and lead. For sensors of lesser life, the cell electrodes may be comprised of like or dissimilar metals not forming stable fluorides and compounds of the reducible gas. In this case, sensor life is limited by the presumed development of a space charge, e.g., a cluster of $F^-$ and $SO_2^-$ or $O_{2-}$ anions, in the vicinity of the anode, which ultimately reduces cell current to nil.

While the above reactions presume the absence of water vapor, experimental results show that same does not affect cell sensitivity to reducible gases. On the other hand, in contrast to the above-discussed prior devices, the sensor is not dependent upon the presence of water vapor in its operation.

Where a reducible gas of interest and one or more reducible gases not of interest are present in the ambient environment, sensor output currents derived at different electrode potential differences may be compared in determining the concentration of the gas of interest in the ambient environment. Sensors of the invention may incorporate selectively permeable films which provide a barrier to such contaminants and/or to gases while permitting substantially free ingress of the reducible gas of interest into the cell electrolyte. In sensing, oxygen in a contaminated environment, for example, the film may be comprised of Teflon (polytetrafluoroethylene) or polyethylene. Where a film is used, the sensor apparatus may include further a support member in cooperative association with the film to provide a contaminant-free casing for containment of cell components. The support member may be comprised of a glass or ceramic electrically insulative substrate.

The relative positions of the anode and cathode metals in the electromotive series are determinative of whether cells made in accordance with the invention themselves provide interelectrode potential difference sufficient to provide for electron capture by the reducible gas of interest, i.e., attachment of electrons to molecules thereof, or whether an external power source is required. Thus, in an oxygen sensor having a cell comprised of a bismuth anode, a gold cathode and an electrolyte of lanthanum fluoride, an interelectrode potential difference of magnitude greater than that required for electron capture by oxygen, i.e., approximately 0.2 volt, is provided. Theoretically, this potential difference is 0.57 volt, and same has been closely approached in practice as is discussed hereinafter. On the other hand, where a silver anode is substituted for the bismuth anode of this cell, as in the case of the cell whose electrochemical reactions were discussed above, the theoretical expectation of potential difference is 0.11 volt. Such interelectrode potential difference is insufficient for electron capture by oxygen, and an externally-impressed potential difference is required.

Figure 3:
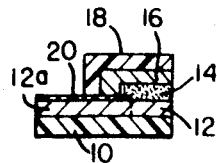
FIG. 3 is a partial sectional view taken along the line III—III of FIG. 1.
Figure 2:
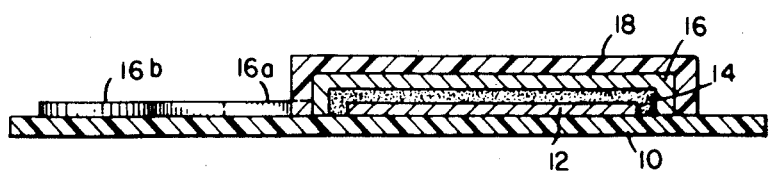
FIG. 2 is a sectional view taken along the line II—II of FIG. 1.
Figure 7:
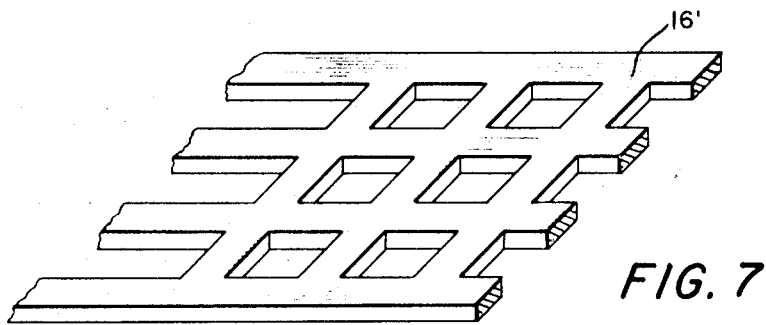
FIG. 7 is a perspective view of an electrode configuration useful in the sensor of FIG. 1.

Referring to FIGS. 1, 2, and 3 one structural arrangement of the sensor and electrochemical cell comprises an insulative support member 10, a thin film of anodic metal 12 overlying said support member, a thin film of solid electrolyte 14 overlying said anodic film and said support member, a thin film of cathodic metal 16 overlying said electrolyte and said support member and an optional thin film 18 overlying said cathodic film and said support member. As above discussed, such film is employed where protection against contaminants is required. While the film may exhibit selective permeability to gas, comparison of sensor output currents at different interelectrode potentials is preferred where multiple reducible gases are present in the ambient environment.

In said arrangement cell elements 12, 14, and 16 are substantially circular films concentrically disposed relative to the center of the sensor. Film 14 is in contiguous electrical contact with films 12 and 16 and is in separating relation thereto. Thus all conductivity between anodic film 12 and cathodic film 16 occurs through electrolyte film 14. While these films are all in further contacting relation to support member 10, since this member is insulative no inter film conductivity is provided thereby. The same is true for film 18 which is electrically insulative.

Anodic film 12 includes a strip portion 12a extending through films 14 and 16 (FIG. 3) to the exterior of the sensor, said strip terminating in anode pad 12b by which electrical connection may be made to the anodic film. To preserve cell geometry as respects anode-cathode conductivity through electrolyte film 14, and to prevent direct short-circuiting of films 12 and 16, insulative layer 20 is arranged in overlying relation to anodic film strip portion 12a and support member 10 to enclose strip portion 12a and electrically insulate same from films 14 and 16.

Electrical connection is made to cathodic film 16 through strip portion 16a and pad 16b. As strip portion 16a extends exteriorly of the sensor, same contacts only insulative film 18 and insulative support member 10. Since no contact is made with underlying enclosed films 12 and 14, no insulative member need be employed in conjunction with strip portion 16a.

In manufacture of the sensor illustrated in FIGS. 1–3, the various films are deposited in vacuum through appropriate masks onto support member 10. Typically a glazed alumina sheet, "Alsimag" 614 (American Lava Corp.) 1/32 inch in thickness with a 743 glaze of borosilicate, is loaded into a vacuum deposition chamber together with evaporation boats each containing material for one of the sensor films. The support member is selectively positioned in target positions above the respective material-containing boats by a turntable or carousel. Evaporation masks are supported between the boats and targets on a second carousel which can be raised to bring a mask into contact with the support member. The chamber is evacuated by means of an ion absorption pump to 2.5 to $10^{-8}$ torr and pressure is maintained throughout the deposition process at 2 to 4 times $10^{-7}$ torr. The support member is heated to in excess of 125° C. to remove water and other absorbed contaminants. Thereupon the anodic film evaporation mask is raised against the support member and the anodic film material boat is moved into registration with the substrate and mask. The boat is then heated with current flow predetermined to give sufficiently rapid deposition, the rate of deposition of each material being selected to insure a smooth and even layer.

Upon completion of deposition of the anodic film, the evaporation boat containing the material constituting insulative film 20 is moved into target position and the evaporated mask corresponding to desired insulative film geometry is raised against the anodic-filmed support member. Thereupon film 20 is deposited over the limited anodic film area illustrated in FIG. 1.

Upon completion of deposition of insulative film 20 upon the support member and anodic film 12, the evaporation boat containing electrolyte film material is moved into the target position and the electrolyte film evaporation mask is raised against the support member in place of the anodic mask and deposition of this film ensues. As particularly illustrated in FIG. 3, the deposited electrolyte film is spaced at a limited portion of the circular periphery thereof from anodic film 12 by insulative layer 20. Substrate temperature is maintained at approximately 125° C. and evaporation is maintained at a relatively slow rate. Such method parameters provide for a reduced number of grain boundaries, low internal electrolyte resistance and avoidance of amorphous electrolyte structure.

Deposition of cathodic film 16 is next performed by movement of the cathodic film material evaporation boat and evaporation mask into the target position. As illustrated in FIG. 1, the cathodic film mask defines strip portion 16a and pad 16b in addition to the interior circular cathodic film proper. As illustrated in FIG. 2, the strip pad portions 16a and 16b are deposited directly upon support member 10 whereas all remaining portions of the cathodic film are deposited upon electrolyte film 14 and insulative layer 20 (FIG. 3). Finally the deposition of permeable film 18 is accomplished by movement of the appropriate evaporation boat and mask into the target position. This film is deposited over the entire exposed surface of cathode film 16 except for pad 16b and most of strip portion 16a. This film contacts insulative film 20 as is shown in FIG. 3.

In the sensor of FIGS. 1–3 the reducible gas of interest must permeate both film 18 and film 16 in order to gain access to electrolyte film 14 for modification of cell conductivity. Film 18 may readily be comprised of a material permeable to one or more gases. Cathodic film 16 may readily be rendered permeable to gas in this arrangement, since, by suitable control of film geometry and deposition parameters, a high degree of permeability to reducible gases is provided. Thus, the cathodic material may be deposited in minute islands to form a composite film having porosity to the reducible gas molecules. The cathode may take on a network configuration, as illustrated for cathode film 16' in FIG. 7. A pair of network films, one overlayed on the other with the grid patterns of one film offset relative to the other may also be employed. A distinct advantage in the construction of the sensor of FIGS. 1–3 and 7 is that puncture of film 18 as by abrasion or the like exposes only noble metal to the ambient environment and not the more contaminant-susceptible electrolyte film 14.

In use of a sensor of the invention of the type whose electrochemical cell does not itself provide an interelectrode potential difference of magnitude sufficient for attachment of electrons to reducible gas, an external electrical circuit, comprising in series a current indicating meter 22 and a voltage supply 24, is connected to terminal pads 12b and 16b. A suitable potential difference, e.g., in excess of 0.2 volt in the case of oxygen, is thereby established between anodic film 12 and cathodic film 16. Cell conductivity as modified in accordance with ingress of the reducible gas into electrolyte film 14 through films 16 and 18 is readily indicated by the current indicating meter, providing a measurement of concentration of the gas in the environment ambient to film 18. Where the alternate self-powered type of sensor of the invention is used, supply 24 is replaced by connecting line 25, shown in dotted lines in FIG. 1.

As is customary in vacuum deposition of metallic layers onto glass or ceramic substrates it is within the contemplation of the invention to incorporate film underlays providing anchorage for the deposited films. For example, selective deposition of a thin film of chromium on support member 10 and other substrates prior to the above-described deposition steps is within the purview of the invention. The invention also contemplates the step of subjecting the electrolyte film to X-ray treatment to increase Schottky defects, and the introduction of excess fluorine ion vacancies in the electrolyte, as by doping the electrolyte with a divalent metal fluoride, where greater sensitivity is desired.

Figure 4:
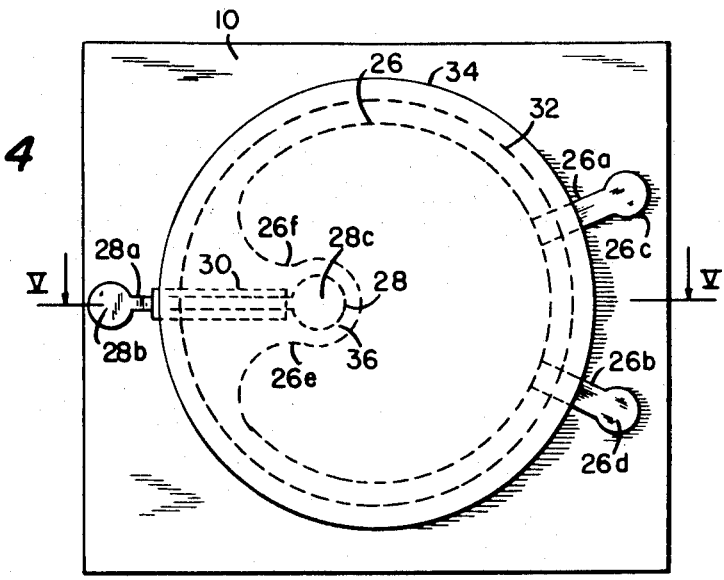
FIG. 4 is a plan view of an alternate embodiment of the sensor of the invention.
Figure 5:
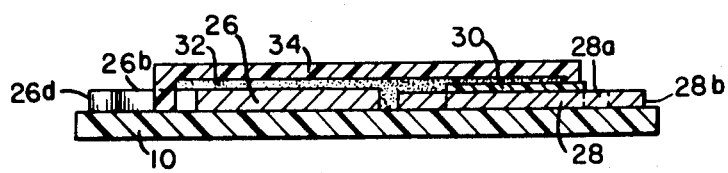
FIG. 5 is a sectional view taken along the line V—V of FIG. 4.

An alternate arrangement of the sensor is illustrated in FIGS. 4 and 5. In this structure anodic film 26 and cathodic film 28 are disposed in coplanar relation on support member 10, anodic strip portions 26a and 26b are provided with terminal pads 26c and 26d, and cathodic strip portion 28a terminates in pad 28b. An insulative film 30 is arranged in overlying relation to cathodic strip portion 28a and support member 10 to place only central circular cathodic film area 28c in contact with the overlying electrolyte film 32. Film 32 is in enclosing contact with substantially all of anodic film 26. Film 34 contactingly overlies electrolyte film 32, insulative film 30 and support member 10.

In FIG. 4 it will be noted that a particular geometry is established between anodic film 26 and cathodic film 28 by appropriate shaping of the anodic and cathodic evaporation masks and by use of insulative layer 30. Thus, a substantially circular electrolytic path 36 is provided between films 26 and 28 through film 32. Any tendency for cathodic strip portion 24a to actively participate in cell conduction and alter the substantially uniform electrolytic path between anode and cathode is thwarted by insulative enclosure of same within film 30 and support member 10. Similarly any tendency for the anodic film to disturb such electrolytic path is avoided by deviating anodic film geometry at film areas 26e and 26f adjacent film 30.

Figure 6:
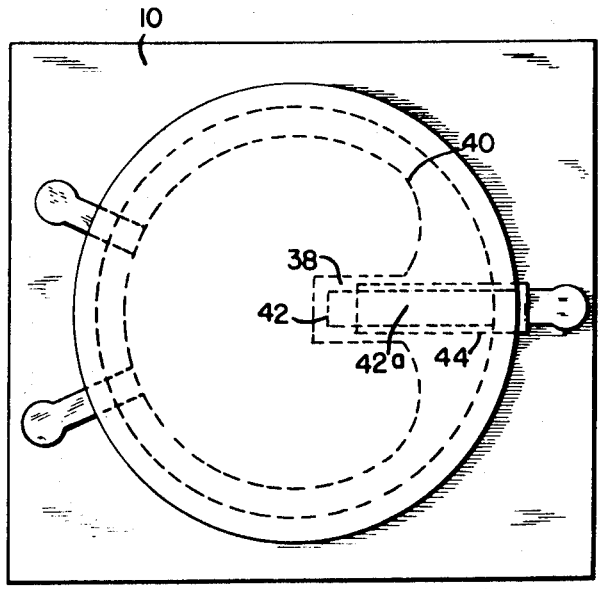
FIG. 6 is a plan view of a further embodiment of the sensor of the invention.

Rectangular film geometry providing a like substantially uniform electrolytic path 38 between anodic film 40 and cathodic film 42 is illustrated in FIG. 6. Therein insulative film 44 and support member 10 insulatively enclose cathodic film strip portion 42a.

In vacuum chamber manufacture of the sensor illustrated in FIGS. 4 and 5, the sequence of deposition steps comprises the initial deposition of anodic film 26 on support member 10, then the deposition of coplanar cathodic film 28 on the support member, next the deposition of insulative film 30 on cathodic film 28 and support member 10, then the deposition of electrolyte film 32 on all of the underlying films and support member as indicated in FIG. 5, and finally the deposition of film 34 on insulative film 30, electrolyte film 32 and support member 10.

The operation of sensors constructed in accordance with FIGS. 1–3 and FIGS. 4–5 will be evident from the following examples.

Example 1

A sensor having the structure of FIGS. 1–3 is constructed by employing the aforementioned "Alsimag" 614 glazed alumina sheet, silver anodic film material, lanthanum fluoride electrolyte film material, gold cathodic film material and Teflon permeable film material. The respective film thicknesses are: 2000 A., 1000 A., 2000 A., and 2000 A. The insulative layer material is silicon dioxide.

Cathodic film pad 16b is connected to the negative terminal of a power supply and one terminal of a micromicroammeter is connected in series with the positive terminal of the power supply and grounded, and the other meter terminal is connected to the anodic film pad 12b. The sensor is subjected to environments containing respectively zero percent, twenty-one percent and one hundred percent oxygen, the remaining constituent of the gaseous environment being nitrogen.

A potential of −0.5 volt is applied to the cathode. In response to the first environment, the meter reading is $6 \times 10^{-12}$ amp. In response to the second environment the meter reading is $1.75 \times 10^{-11}$ amp. In response to the third environment the meter reading is $6.2 \times 10^{-11}$ amp. Upon repeated exposure to these same three environments, the respective meter readings are within five percent of the above readings.

Example 2

A sensor having the structure of FIGS. 4–5 is constructed by employing the aforementioned "Alsimag" 614 glazed alumina sheet, silver anodic film material, lanthanum fluoride electrolyte film material, gold cathodic film material and Teflon permeable film material. The respective film thicknesses are: 2000 A., 1000 A., 2000 A., and 2000 A. The insulative layer material is silicon dioxide.

Cathodic film pad 28b is connected to the negative terminal of a power supply and one terminal of a micro-microammeter is connected in series with the grounded positive terminal of the power supply, and the other meter terminal is connected to both anodic film pads 26c and 26d. The sensor is subjected to environments containing respectively one hundred percent nitrogen and one hundred percent oxygen.

A potential of $-0.5$ volt is applied to the cathode. In response to the first environment, the meter reading is $2 \times 10^{-10}$ amp. In response to the second environment the meter reading is $12 \times 10^{-10}$ amp. Upon repeated exposure to these same environments, the respective meter readings are within five percent of the above readings. In the sensors of the invention, oxygen sensitivity is provided over a range of cathode-applied voltages of from $-0.2$ to $-0.7$ volt.

Example 3

A sensor having the structure of FIGS. 1–3 is constructed by employing the aforementioned "Alsimag" 614 glazed alumina sheet, gold cathodic film material, praseodymium fluoride electrolyte film material, bismuth anodic film material and Teflon permeable film. The respective film thicknesses are: 804 A., 2744 A., 3174 A., and 2000 A. The insulative film material is silicon dioxide. An open circuit voltage of 0.40 volt exists between the anode and cathode and is measureable between pads 12b and 16b. The terminals of a micro-microammeter are connected to these pads. No external power supply is employed. The sensor is subjected to environments containing respectively zero percent, twenty-one percent and one hundred percent oxygen. In response to the first environment the meter reading is $2 \times 10^{-10}$ amp. In response to the second environment the meter reading is $4 \times 10^{-10}$ amp. In response to the third environment the meter reading is $1.2 \times 10^{-9}$ amp.

Example 4

A sensor having the structure of FIGS. 1–3 is constructed as in Example 3 with neodymium fluoride substituted for praseodymium fluoride. The respective film thicknesses are: 878 A., 2598 A., 2200 A., and 2000 A. The insulative film material is silicon dioxide. An open circuit voltage of 0.36 volt exists between the anode and cathode and is measureable between pads 12b and 16b. The terminals of a micro-microammeter are connected to these pads. No external power supply is employed. The sensor is subjected to environments containing respectively zero percent, twenty-one percent and one hundred percent oxygen. In response to the first environment the meter reading is $5.5 \times 10^{-10}$ amp. In response to the second environment the meter reading is $1.04 \times 10^{-9}$ amp. In response to the third environment the meter reading is $3.0 \times 10^{-9}$ amp.

Example 5

A sensor having the structure of FIGS. 1–3 is constructed as in Example 3 with cerium fluoride substituted for praseodymium fluoride. The respective film thicknesses are: 3495 A., 7497 A., 1866 A., and 2000 A. The insulative film material is silicon dioxide. An open circuit voltage of 0.24 volt exists between the anode and cathode and is measureable between pads 12b and 16b. The terminals of a micro-microammeter are connected to these pads. No external power supply is employed. The sensor is subjected to environments containing respectively zero percent, twenty-one percent and one hundred percent oxygen. In response to the first environment the meter reading is $1 \times 10^{-10}$ amp. In response to the second environment the meter reading is $2.75 \times 10^{-10}$ amp. In response to the third environment the meter reading is $9.7 \times 10^{-10}$ amp.

Example 6

A sensor having the structure of FIGS. 1–3 is constructed as in Example 3 with lanthanum fluoride substituted for praseodymium fluoride. The respective film thicknesses are: 2015 A., 8635 A., 4320 A., and 2000 A. The insulative film material is silicon dioxide. An open circuit voltage of 0.50 volt exists between the anode and cathode and is measureable between pads 12b and 16b. The terminals of a micro-microammeter are connected to these pads. No external power supply is employed. The sensor is subjected to environments containing different proportions of oxygen and different currents are indicated by the meter for each environment as in Examples 3–5.

Example 7

A sensor is constructed by employing gold anodic film material, lanthanum fluoride electrolyte film material and gold cathodic film material layered on a glazed alumina sheet generally as in FIGS. 1–3 and 7. The respective film thicknesses are: 2232 A., 6672 A., and 2549 A.

The cathodic film is connected to the negative terminal of a power supply and one terminal of a micro-microammeter is connected in series with the positive terminal of the power supply and grounded, and the other meter terminal is connected to the anodic film. The sensor is subjected to environments containing respectively zero percent, twenty-one percent, fifty percent and one hundred percent sulfur dioxide, the remaining constituent of the gaseous environment being nitrogen.

A potential of $-1.6$ volt is applied to the cathode. In response to the indicated environments, the meter readings are $6 \times 10^{-10}$, $1.5 \times 10^{-9}$, $2.2 \times 10^{-9}$ and $3.0 \times 10^{-9}$ amp., respectively.

Example 8

A sensor is constructed as in Example 7 with a nickel anode substituted for the gold anode, the respective film thicknesses being 1872 A., 8881 A., and 3263 A. The sensor is connected to a power supply and meter as in Example 7 and is subjected to an environment containing one hundred percent $SO_2$. The power supply voltage is set at one hundred millivolt increments from $-1000$ mv. to 1000 mv., and current readings are taken. From a plot of this voltage and current data, it is determined that the sensor has a threshold of sensitivity to ambient $SO_2$ at 0.4 to 0.45 volt.

Example 9

Sensors having the structures of Examples 7 and 8 are constructed and evaluated as in Example 8 and determined to have thresholds of sensitivity to ambient $SO_2$ within a range of voltages from 0.4 to 0.8 volt.

Example 10

A sensor is constructed by employing glazed alumina sheet, gold anodic film material, lanthanum fluoride electrolyte film material and gold cathodic film material layered on a glazed alumina sheet generally as in FIGS. 1–3 and 7. The respective film thicknesses are: 2946 A., 8353 A., and 1719 A.

The cathodic film is connected to the negative terminal of a power supply and one terminal of a micro-microammeter is connected in series with the positive terminal of the power supply and grounded, and the other meter terminal is connected to the anodic film. The sensor is subjected to environments containing respectively zero percent, twenty-five percent, fifty percent, seventy-five percent and one hundred percent carbon dioxide, the remaining constituent of the gaseous environment being nitrogen.

A potential of $-1.1$ volts is applied to the cathode. In response to the indicated environments, the meter readings are $0.0 \times 10^{-10}$, $2.8 \times 10^{-10}$, $5.2 \times 10^{-10}$, $7.3 \times 10^{-10}$ and $9.2 \times 10^{-10}$ amp., respectively.

Example 11

A sensor is constructed as in Example 10 with a nickel anode substituted for the gold anode, the respective film thicknesses being 1526 A., 7409 A., and 1719 A. The sensor is connected to a power supply and meter as in Example 7 and is subjected to an environment containing one hundred percent $CO_2$. The power supply voltage is set at one hundred millivolt increments from −1000 mv. to 1000 mv., and current readings are taken. From a plot of this voltage and current data, it is determined that sensor has a threshold of sensitivity to ambient $CO_2$ at 0.25 to 0.45 volt.

Example 12

Sensors having the structures of Examples 10 and 11 are constructed and evaluated as in Example 11 and determined to have thresholds of sensitivity to ambient $CO_2$ within a range of voltages from 0.3 to 0.8 volt.

Example 13

A sensor is constructed as in Example 8, the respective film thicknesses being 420 A., 8475 A., and 1864 A. The sensor is connected to a power supply and meter as in Example 7 and is subjected to environments containing respectively zero percent, twenty-five percent, fifty percent, seventy-five percent, and one hundred percent nitrogen dioxide, the remaining constituent of the gaseous environment being monochlorodifluoromethane.

A potential of −300 mv. is applied to the cathode. In response to the indicated environments, the meter readings are $2.4 \times 10^{-10}$, $3.3 \times 10^{-10}$, $1.8 \times 10^{-9}$, $9.1 \times 10^{-9}$, and $6.2 \times 10^{-8}$ amp., respectively.

Example 14

A sensor is constructed as in Example 7, the respective film thicknesses being 1409 A., 10781 A., and 1031 A. The sensor is connected to a power supply and meter as in Example 7 and is subjected to an environment containing one hundred percent $NO_2$. The power supply voltage is varied from −300 mv. to 0 mv. and current readings are taken. From this voltage and current data, it is determined that the sensor has a threshold of sensitivity to ambient $NO_2$ at 0.0 to 0.1 volt.

Example 15

A sensor is constructed as in Example 7, the respective film thickness being 2052 A., 7090 A., and 1162 A. The sensor is connected to a power supply and meter as in Example 7 and is subjected to environments containing respectively zero percent, twenty-five percent, fifty percent, seventy-five percent, and one hundred percent nitric oxide, the remaining constituent of the gaseous environment being nitrogen.

A potential of −1.0 volt is applied to the cathode. In response to the indicated environments, the meter readings are $5.3 \times 10^{-11}$, $1.0 \times 10^{-10}$, $1.5 \times 10^{-10}$, $1.95 \times 10^{-10}$, and $2.3 \times 10^{-10}$ amp., respectively.

Example 16

The sensor of Example 15 is connected to a power supply and meter as in Example 7 and is subjected to an environment containing one hundred percent NO. The power supply voltage is varied from −2000 mv. to 300 mv., and current readings are taken. From this voltage and current data, it is determined that the sensor has a threshold of sensitivity to ambient NO at 0.0 to 0.1 volt.

In Examples 13–16 pure samples of $NO_2$ and NO were used. As will be evident, the sensors of these examples may be termed $NO_x$ sensors since, in the absence of such pure samples, the several species of $NO_x$ gas are generally present at the same time. It will be observed that the thresholds of sensitivity for such species, e.g., $NO_2$ and NO are substantially the same.

From the foregoing examples, it will be evident that sensors adapted to sense a reducible gas in the presence of the inert gas may, in accordance with the invention, comprise a rare earth fluoride electrolyte in combination with a cathode and an anode which (1) may have the same composition as the cathode, (2) may be of dissimilar composition than the cathode and as such may, with the cathode, provide sufficient electrode potential difference to effect electron capture by reducible gas molecules without assist by an external power supply or (3) may be comprised of a material forming stable fluorides and stable compounds of the reducible gas. In the case of long life sensors, the last-mentioned anode characteristic above is requisite. The second-mentioned anode characteristic is requisite in applications wherein a power source external to the sensor is either unavailable or prohibited by cost or space limitations.

While the sensors described in the foregoing examples detect a single reducible gas admixed with an inert gas, sensors constructed in accordance with the invention may readily detect a reductible gas admixed with other reducible gases. This is preferably accomplished by a technique which has been referred to above as the comparison of sensor output currents for different applied voltages. This technique will now be described in detail.

Assume that an ambient environment is known to contain nitrogen dioxide, oxygen and sulfur dioxide and otherwise to contain inert gases and that data concerning the concentration of each of the three reducible gases is desired. Three sensors of the type illustrated in FIG. 1 are constructed. For each sensor, the cathode thereof is connected to the negative terminal of a power supply and the anode thereof is connected through a micro-microammeter to the positive terminal of the power supply. With the terminal voltage of the power supply associated with the first sensor set to the threshold of sensitivity to $NO_2$, above discussed, the output current of the first meter is noted. With the terminal voltages of the supplies associated with the second and third sensors respectively set to the thresholds of sensitivity to $O_2$ and $SO_2$, above discussed, the output currents of the second and third meters are noted.

The first meter output current is directly indicative of the concentration of $NO_2$ in the environment. The second meter output current is indicative of the combined concentration of $NO_2$ and $O_2$ in the environment. The third meter output current is indicative of the combined concentration of $NO_2$, $O_2$ and $SO_2$ in the environment. The concentration of $O_2$ in the environment may be readily determined by differential comparison of the output currents of the first and second meters. Similarly, the concentration of $SO_2$ in the environment may be determined by differential comparison of the output current of the third meter and the output current of the second meter.

In this technique for determining the concentrations of plural reducible gases commonly present, an individual composite sensor may be readily constructed, as a substitute for the three sensors of the example, by thin film deposition techniques similar to those discussed above, the primary modification being the provision of suitable masking to maintain each individual sensor in the composite sensor electrically independent.

Where sufficiently selective reducible gas permeable films are available, a single sensor may be employed, as discussed above, for measuring one or more species of reducible gases commonly present in the ambient environment.

In the foregoing multiple sensor example, anode and cathode metals may be selected so as to provide the interelectrode potential differential required for detection, in which event the external power supplies need not be provided. Moreover, where the constituency of the ambient environment does not vary over extended periods of time, an individual sensor may be subjected to different applied potentials to provide the aforesaid current readings and the same may be compared to determine discrete reducible gas concentration.

By reason of the above-discussed minute thicknesses for the film employed in the sensor of the invention, miniaturization and micro-miniaturization of the device is readily enabled. Thus, sensors of appropriate size demanded by such applications as medical diagnosis, e.g., determination of oxygen tension in blood by direct intracellular measurement, and various other space-limited applications may be readily constructed by the above-discussed solid-state thin film techniques. Further, by reason of the absence of any liquid constituent susceptible to sloshing, vibration or shock-induced performance aberration, sensors constructed in accordance with the invention are readily adapted for use in rugged environments, such as sewage treatment, wherein biological oxygen demand is customarily determined to indicate sewage strength.

In those applications requiring self-powered sensors, anode-cathode metal combinations are selected by reference to the electromotive series, as discussed above, such that differences in the work functions of these electrodes (open circuit) will provide the interelectrode potential difference required for electron capture by the reducible gas of interest. In Examples 3–6, the anode-cathode metal combination, bismuth-gold, is a preferred selection. Other usable combinations include, e.g. lanthanum-gold, lanthanum-rhodium, beryllium-platinum, etc. As indicated by Examples 1–2 and 7–16 and other discussion above, those metal combinations having work function differentials providing less than the potential difference required for such electron capture, e.g., silver-gold, gold-gold, etc., provide sensors useful in applications where external power may be made available without difficulty.

While the invention has been disclosed by way of the foregoing particularly preferred embodiments, various modifications thereto will be evident to those skilled in the art and thus such embodiments are intended in a descriptive and not in a limiting sense. The spirit and scope of the invention will be evident from the following claims.

What is claimed is:

1. A reducible gas sensor comprising an electro-chemical cell having a noble metal cathode, an anode spacedly disposed with respect to said cathode and comprised of a metal dissimilar from said cathode metal, and a thin film solid rare earth fluoride electrolyte in contacting relation with said anode and said cathode, said cell providing ambient reducible gas with ingress into said electrolyte, the conductivity of said electrolyte varying in accordance with variation in ambient concentration of said reducible gas.

2. The sensor claimed in claim 1 further including a cell casing permeable to said reducible gas.

3. The sensor claimed in claim 2 wherein said casing is defined by cooperating reducible gas permeable insulative and reducible gas impermeable insulative members, said permeable member in contacting relation with a first surface of said cathode, said impermeable member in contacting relation with a first surface of said anode, said electrolyte interposed between said cathode and said anode and in contacting relation with another surface of said cathode and of said anode.

4. The sensor claimed in claim 3 wherein said anode, cathode, electrolyte and permeable member are thin films, said anodic and cathodic films including portions extending through and exteriorly of said permeable film, said film portions defining terminals for said sensor.

5. The sensor claimed in claim 4 further including an insulative film in contacting relation with and partially overlying said anodic film and insulating said anodic film portion from said cathodic film.

6. The sensor claimed in claim 4 wherein said cathodic film is in network form.

7. The sensor claimed in claim 2 wherein said casing is defined by cooperating reducible gas-permeable insulative and reducible gas-impermeable insulative members, said permeable member in contacting relation with a first surface of said electrolyte, said impermeable member in contacting relation with first surfaces of said anode and of said cathode, another surface of said anode and of said cathode in contacting relation with another surface of said electrolyte.

8. The sensor claimed in claim 7 wherein said anode, cathode, electrolyte and permeable member are thin films, said anodic and cathodic films including portions extending through and exteriorly of said permeable film, said film portions defining terminals for said sensor.

9. The sensor claimed in claim 8 further including an insulative film in contacting relation with and partially overying said cathodic film and defining a substantially uniform electrolytic path between said cathodic and said anodic films.

10. The sensor claimed in claim 1 wherein said anode and said cathode are comprised of metals having work functions providing an open-circuit potential difference of magnitude equal to or greater than the voltage at which molecules of said reducible gas capture electrons.

11. Apparatus for measuring a reducible gas concentration comprising the sensor claimed in claim 10 and a current indicator in series circuit with said anode and said cathode.

12. The sensor claimed in claim 1 wherein said anode is comprised of a metal forming stable fluorides and stable compounds of said reducible gas.

13. The sensor claimed in claim 1 wherein said electrolyte is lanthanum fluoride.

14. The sensor claimed in claim 1 wherein said electrolyte is praseodymium fluoride.

15. The sensor claimed in claim 1 wherein said electrolyte is neodymium fluoride.

16. The sensor claimed in claim 1 wherein said reducible gas is oxygen.

17. The sensor claimed in claim 1 wherein said reducible gas is sulfur dioxide.

18. The sensor claimed in claim 1 wherein said reducible gas is carbon dioxide.

19. The sensor claimed in claim 1 wherein said reducible gas is nitrogen dioxide.

20. The sensor claimed in claim 1 wherein said reducible gas is nitric oxide.

21. Apparatus for measuring a reducible gas concentration comprising the sensor claimed in claim 1 and electrical circuit means comprising a current indicator and a power supply in series circuit wth said anode and said cathode.

22. A method of examining a sample for concentration of a reducible gas therein by:
 (a) providing an electrochemical cell having a noble metal cathode, an anode spacedly disposed with respect to said cathode and a thin film solid rare earth fluoride electrolyte in contacting relation with said anode and said cathode, said cell providing ambient reducible gas with ingress into said electrolyte, and conductivity of said electrolyte varying in accordance with variation in ambient concentration of said reducible gas;
 (b) while maintaining a potential difference between said cathode and said anode providing electron capture by said reducible gas, exposing said cell to said sample, and measuring the current flowing between said anode and said cathode; and
 (c) utilizing such current measurement in determining the concentration of said reducible gas in said sample.

23. The method claimed in claim 22 wherein said step of maintaining said potential difference between said cathode and said anode is practiced by providing said cell with an anode of a first metal and a cathode of a second metal dissimilar from said first metal, said first and second metals being so positioned in the electromotive series as to provide said potential difference.

24. The method claimed in claim 22 wherein said step of maintaining said potential difference between said cathode and said anode is practiced by connecting said cathode and said anode to the terminals of a voltage supply, said supply providing said potential difference between said terminals.

25. A method for determining the concentration of a reducible gas of interest in a sample comprising the steps of:
   (a) providing an electrochemical cell having a noble metal cathode, an anode spacedly disposed with respect to said cathode and a thin film solid rare earth fluoride electrolyte in contacting relation with said anode and said cathode, said cell providing ambient reducible gas with ingress into said electrolyte, the conductivity of said electrolyte varying in accordance with variation in ambient concentration of said reducible gas;
   (b) calibrating said cell to provide correlation of cell current and concentration of said reducible gas of interest by separately exposing said cell to first and second mediums having known different concentrations of said reducible gas of interest and measuring the current flowing between said anode and said cathode in response to each said medium while maintaining a potential difference between said cathode and said anode providing electron capture by said reducible gas; and
   (c) while maintaining said potential difference between said cathode and said anode, exposing said cell to said sample, and measuring the current flowing between said anode and said cathode.

26. The method claimed in claim 25 wherein said steps of maintaining said potential difference between said cathode and said anode are practiced by providing said cell with an anode of a first metal and a cathode of a second metal dissimilar from said first metal, said first and second metals being so positioned in the electromotive series as to provide said potential difference.

27. The method claimed in claim 25 wherein said steps of maintaining said potential difference between said cathode and said anode are practiced by connecting said cathode and said anode to the terminals of a supply, said supply providing said potential difference between said terminals.

28. The method claimed in claim 25 wherein said sample includes a second reducible gas having an electron capture potential of lesser magnitude than that of said reducible gas of interest, including the further steps of:
   (d) exposing said cell to said sample while maintaining a potential difference between said cathode and said anode providing electron capture by said second reducible gas but less than the potential difference in step (c) and measuring the current flowing between said anode and said cathode; and
   (e) subtracting the current measured in step (d) from the current measured in step (c).

29. The method claimed in claim 25 wherein said sample includes a second reducible gas having an electron capture potential of greater magnitude than that of said reducible gas of interest and wherein said step (c) potential difference is further maintained less than said second reducible gas electron capture potential.

References Cited

UNITED STATES PATENTS

| | | | |
|---|---|---|---|
| 3,271,192 | 9/1966 | Thun et al. | 117—217 |
| 3,261,902 | 7/1966 | Pearce et al. | 317—234 X |
| 3,375,420 | 3/1968 | Sher et al. | 317—258 |

OTHER REFERENCES

A. Sher et al.: Physical Review, vol. 144, No. 2, pp. 593–604 (1966).

GERALD L. KAPLAN, Primary Examiner

U.S. Cl. X.R.

204—195 S